Patented Feb. 13, 1951

2,541,252

UNITED STATES PATENT OFFICE 2,541,252

STABILIZED CELLULOSE ETHERS

William B. Horback, Irvington, N. J., assignor to Celanese Corporation of America, a corporation of Delaware No Drawing. Application April 16, 1948, Serial No. 21,557

6 Claims. (Cl. 260—17)

This invention relates to the preparation of thermoplastic molding compositions, and relates more particularly to color stable thermoplastic molding compositions having a basis of a cellulose ether such as ethyl cellulose or benzyl cellulose.

An object of this invention is the preparation of improved cellulose ether molding compositions of increased stability and high resistance to the action of heat, light and other agencies which tend to produce color, brittleness and surface changes in said materials when molded.

Another object of this invention is the preparation of stabilized ethyl cellulose or other stable cellulose ether compositions employing stabilizing agents which do not of themselves materially affect the viscosity, dimensional stability or resistance to crazing or produce objectionable brittleness in the molding compositions while producing the desired color stabilizing action.

Other objects of this invention will appear from the following detailed description.

Thermoplastic compositions having a basis of ethyl cellulose, which compositions are widely employed commercially for the preparation of molded articles, possess certain characteristics which impair their utility. For example, some molded ethyl cellulose compositions possess an inherent yellowish color even prior to molding, while others frequently develop yellowish or yellowish-brown colors during processing operations. The latter characteristic is especially noticeable where the processing operations are accompanied by the use of heat.

Where some inherent color is initially present in the ethyl cellulose compositions, this color may bleech to a lighter shade, or even disappear upon exposure to light. This characteristic of color instability makes a standardized or controlled application of such ethyl cellulose compositions quite difficult. For example, where a colorist is working with an ethyl cellulose composition which possesses some inherent color initially, he may be able to match a particular shade to a known, colored standard without difficulty. However, on prolonged exposure of the colored compositions to light, there will occur therein a change in shade of very noticeable degree because the bleeching action of the light causes some loss in color initially present in the composition. When working with a particular ethyl cellulose which develops some color on molding or during other processing operations involving the use of heat, the color which is known to develop must be compensated for with care in order that the final molded product will have the exact shade which is desired. Even the slightest deviation from the desired molding conditions, such as, for example, a slight increase or decrease in the time or temperature of molding, will appreciably alter the shade. The use of various stabilizers which may or may not have a plasticizing action on the cellulose ether has been proposed in order to overcome this tendency toward color instability in ethyl cellulose compositions.

Among the various plasticizing agents which have heretofore been employed for the formation of plasticized cellulose ether compositions are the neutral organic phosphites. The art contains numerous references to the use of said neutral organic phosphites as plasticizers for cellulose ether compositions and also attributes to them the characteristic of having a stabilizing action on said cellulose ethers. We have found, however, that when employing neutral organic phosphites in plasticizing amounts, i. e. amounts of 20 to 30% or more on the weight of the cellulose ether being plasticized, or in fact in amounts of as little as 5 to 10% by weight, in plasticized cellulose ether compositions, the neutral organic phosphites effect a marked lowering in the color and heat stability of the cellulose ether compositions when such compositions are subjected to elevated temperatures or prolonged ageing. Under such conditions the neutral organic phosphites tend to decompose readily yielding phosphorous acid which has a pronounced deleterious effect on the cellulose ethers and upon any dyes incorporated therein for the production of colored cellulose ether compositions.

We have now discovered that the usual color instability observed in plasticized ethyl cellulose or other thermoplastic cellulose ether molding compositions containing neutral organic phosphites may be entirely prevented by so forming said molding compositions that the neutral organic phosphite is present in an amount of, at most, 3% by weight. This amount has been found, surprisingly enough, to be a very critical limit. When a greater quantity of a neutral organic phosphite is employed, say even 4% by weight, the undesirable action of these phosphites asserts itself immediately as witnessed by the development of excessive odor and viscosity breakdown on ageing.

The neutral organic phosphites employed in accordance with the novel process of my invention are the neutral organic tri-esters of phosphorous acid. These esters of phosphorous acid may be either symmetrical or mixed esters of phosphorous acid in which the hydrogen atoms of the phosphorous acid are substituted by the same or different monovalent organic radicals. These compounds are usually solids or liquids and may, therefore, be incorporated in the thermoplastic compositions in accurately controlled amounts. Examples of the organic phosphites which may be employed in accordance with our novel process to form stabilized cellulose ether molding compositions are tri-methyl-phosphite, tri-ethyl-phosphite, tri-n-propyl-phosphite, tri-iso-propyl phosphite, tri-n-butyl-phosphite, tri-iso-butyl-phosphite, tri-ethoxyethyl-phosphite, tri-cyclohexyl-phosphite, tri-menthyl-phosphite, tri-phenyl-phosphite, tri-o-cresyl-phosphite, tri-m-cresyl-phosphite, tri-p-cresyl-phosphite, mixtures of said tri-cresyl-phosphite, tri-xenyl-phosphites, tri - 1 - naphthyl - phosphite, tri - 2-naphthyl-phosphite, tri-(2,4 - dibrom - 1 - naphthyl)-phosphite, tri-(1,6-dibrom - 2 - naphthyl)-phosphite, tri - 1 - anthranyl - phosphite, tri-o-xenyl-phosphite, tri-(o-xenyl-di-phenyl)-phosphite, tri-(p-tertiary - butyl - di - phenyl)-phosphite, tri-(o-chloro - phenyl - di - phenyl)-phosphite, tri-(di-o-chloro-phenyl - carvacryl)-phosphite, tri-(di-phenyl-propyl)-phosphite, tri-(di-phenyl-n-butyl)-phosphite and tri-(p-tertiary-amyl-phenyl)-phosphite. The phosphite stabilizing agents are employed, as stated in amounts of, at most, 3% by weight on the weight of the cellulose ether in the stabilized composition. The most valuable results are obtained employing phosphite stabilizers comprising a tri-aryl-phosphite in which the aryl group is a benzene or alkyl-substituted benzene nucleus in which the alkyl group is a straight chain, branched chain or tertiary alkyl group.

The neutral organic phosphite stabilizing agents may be incorporated in the ethyl cellulose molding compositions in any convenient manner. The stabilizing agents may be mixed with the ethyl cellulose when in flake form prior to colloidalization; they may be dissolved or suspended in the plasticizers employed and the solution obtained then combined with the ethyl cellulose; or they may be mixed with the volatile solvents in which the ethyl cellulose is dissolved as where, for example, in the preparation of film materials, a solvent casting operation is employed. The stabilizing agents may also be added directly to the plastic mass while it is being converted or colloidized at elevated temperature on hot rolls, or in a suitable mill such as, for example, a Banbury mixer or a Werner-Pfleiderer kneader.

Various plasticizers may be employed alone, or in combination with each other, to impart particular properties to the novel stabilized compositions of the present invention. The plasticizers are valuable for obtaining the desired flow characteristics, resistance to water, grease or oil, flexibility, hardness or other desired properties in said compositions. Thus, for example, plasticizers such as dibutyl phthalate, n-butyl stearate, tri-cresyl phosphate, tri-phenyl phosphate, dibutyl sebacate or partially hydrogenated isomeric terphenyls may be satisfactorily employed in the preparation of our novel ethyl cellulose compositions. These plasticizers may be employed in amounts of from 5 to 35% or more by weight on the ethyl cellulose present in the composition. Lubricant plasticizers, such as refined mineral oil, may also be employed in amounts of from 5 to 20% or more on the weight of the ethylcellulose. The ethyl cellulose employed in this invention may have an ethoxyl value of 44 to 49%.

This invention is also applicable to the preparation of film, foil, sheets, rods, tubes and similar articles made by methods employing solvents and relatively lower temperatures than prevail in molding, extrusion and like processes. For example, film and foil made by casting at room temperature may be exposed to high temperatures or ultra-violet light in use and therefore may beneficially have incorporated therein said phosphite stabilizing agents. The use of said phosphite stabilizing agents also imparts a substantial degree of resistance to undesirable oxidative changes in films, foils or other shaped ethyl cellulose compositions.

In order further to illustrate my invention, but without being limited thereto the following examples are given:

Example I

Ethyl cellulose of an ethoxyl value of 44.6% is mixed with dibutyl-phthalate in the amounts given below and to the mixtures are added the indicated amounts of tri-cresyl-phosphite and triphenyl-phosphite as stabilizers. The mixtures obtained are dried by infra-red heat and a part of the plasticized compositions obtained then molded for 15 minutes at 200° C. to form discs. The discs obtained on molding each of said compositions have the following properties.

|  | Parts by Weight | | | | |
| --- | --- | --- | --- | --- | --- |
| Ethyl cellulose | 100 | 100 | 100 | 100 | 100 |
| Dibutyl phthalate | 15 | 15 | 15 | 15 | 15 |
| Tri-cresyl phosphite | 1 | 2 | 3 | | |
| Tri-phenyl phosphite | | | | 2 | |
| Yellowness coefficient | 0.39 | 0.30 | 0.28 | 0.36 | 0.54 |

When the plasticized ethyl cellulose composition is molded into discs under the same conditions but without any stabilizing agent being added thereto prior to molding, the disc obtained, as indicated above, has a higher yellowness co-efficient.

These numerical expressions of color development, i. e. the yellowness co-efficient, is obtained by determining the light transmission of the sample in question at 640 m$\mu$; minus that at 440 m$\mu$, divided by the light transmission at 640 m$\mu$; the greater the co-efficient, the greater the degree of color.

Example II

A molding powder is prepared by incorporating 13 parts by weight of dibutyl-phthalate and 2 parts by weight of tricresyl-phosphite in 100 parts by weight of ethyl cellulose of an ethoxyl value of 44.6%, rolling the composition for 15 minutes on hot rolls heated to 275° F. to form relatively thin sheets and then grinding the resulting sheet material to a powder form. A portion of the molding powder obtained is baked in a closed vessel for 25 hours at 110° C. and then both the baked and unbaked powder are molded into discs at 200° C. for 10 minutes. The yellowness co-efficient of the disc molded from the unbaked molding powder is 0.41 while that of the disc molded from the baked molding powder is 0.44. The viscosity of the ethyl cellulose in the unbaked molding powder is 8.9 centipoises, while that of the ethyl cellulose in the baked molding powder is 8.5.

Discs molded of the same ethyl cellulose composition but without any stabilizer present have a yellowness co-efficient of 0.88 and a viscosity of 6.7 centipoises. Discs molded of the same unstabilized molding composition which has been baked for 25 hours at 100° C. prior to the molding operation have a yellowness co-efficient of 0.95 and a viscosity of 3.2 centipoises.

Example III

A molding powder is prepared in accordance with the process described in Example II from 100 parts by weight of ethyl cellulose, 9 parts by weight of mixed partially hydrogenated isomeric terphenyls, 4 parts by weight of light mineral oil and 2 parts by weight of tri-cresyl phosphite. A portion of the composition is then baked for 25 hours at 100° C. When the baked and unbaked compositions are molded into discs at 200° C. for 10 minutes, the discs molded from the unbaked composition have a yellowness co-efficient of 0.57 and a viscosity of 9.3 centipoises. Discs molded of the baked composition have a yellowness co-efficient of 0.55 and a viscosity of 8.7 centipoises.

Example IV

A molding composition is prepared from a mixture of 100 parts by weight of ethyl cellulose of an ethoxyl value of 46.3%, 15 parts by weight of dibutyl-phthalate and 2 parts by weight of tri-cresyl phosphite. The molding powder is molded into a number of disc at 200° C. for 10 minutes. A portion of the molding composition is also molded into discs at 200° C. with the mold being held open for the first 5 minutes of the molding operation and then closed for the remaining 5 minutes. The discs obtained by said open mold test show only a bare trace of decomposition. Control discs molded in the same manner of plasticized ethyl cellulose of the same composition as above but without any tricresyl phosphite present shows marked decomposition as evidenced by the development of very dark brown spots and a syrupy broken-down appearance.

The discs obtained by molding the composition with the mold closed during the entire molding period are then exposed to both the "Fadeometer" and "Weatherometer" tests. The yellowness co-efficient of the discs prior to exposure in the "Fadeometer" is 0.41. After 45 hours exposure the yellowness co-efficient of the disc is 0.30, after 116 hours 0.28, after 160 hours 0.24. An exposure of 100 hours in the "Weatherometer" is necessary to produce any crazing of the surface of the stabilized molded discs.

The control discs have an initial yellowness co-efficient of 0.88 and after 45 hours exposure in the "Fadeometer" have a yellowness co-efficient of 0.69, after 116 hours 0.68, after 160 hours 0.46.

Example V

Discs molded of the molding composition described in Example III are subjected to "Fadeometer" and "Weatherometer" tests as described in Example IV. The discs originally have a yellowness co-efficient of 0.57 as stated in Example III. After exposure in the "Fadeometer" for 45 hours the yellowness co-efficient is 0.43, after 116 hours 0.41, after 160 hours, 0.33, after 213 hours 0.29. An exposure of 110 hours in the "Weatherometer" is necessary in order to produce any crazing of the surface of the molded disc.

Discs molded of the unstabilized composition of Example III treated in the same fashion have an original yellowness co-efficient of 0.92. After exposure in the "Fadeometer" for 45 hours the yellowness co-efficient is 0.74, after 116 hours 0.81, after 160 hours 0.80 and after 213 hours 0.60. An exposure of 50 hours in the "Weatherometer" produces marked crazing in said discs.

Example VI

A molding composition is prepared by mixing 100 parts of ethyl cellulose of an ethoxyl value of 46.3% with 19.5 parts by weight of a mixture consisting of the dimer, trimer and tetramer of polymerized styrene, 5 parts by weight of mineral oil and 0.5 part by weight of tri-phenyl-phosphite. The molding composition is injection molded into Izod impact test bars at 375° F. at a 45 second cycle. The molded bars are then aged at 140° F. The notched Izod impact strength in foot-pounds of the original molded bar is 6.4. After ageing for 5 weeks at 140° F. the impact strength is 4.9; after 9 weeks 3.8. Control bars of the unstabilized composition have an original impact strength of 5 foot-pounds. After ageing at 140° F. for 5 weeks the impact strength is 0.8; after 9 weeks 0.6. The viscosity of the original molded test bar is 13.3 centipoises and after ageing at 140° F. for 5 weeks is 12.0, after 9 weeks 8.7 and after 18 weeks 5.4 centipoises. The viscosity of the original unstabilized control bar is 8.5 centipoises and after ageing at 140° F. for 5 weeks is 3.8, after 9 weeks 2.6 and after 18 weeks 5.4.

Example VII

A molding composition is prepared by mixing 100 parts by weight of ethyl cellulose of an ethoxyl value of 46.3% with 19.21 parts by weight of a mixture consisting of the dimer, trimer and tetramer of polymerized styrene, 5 parts by weight of refined mineral oil and 0.79 part by weight of tri-p-tertiary-amyl-phenyl-phosphite. The composition is molded into Izod impact test bars as described in Example VI and the molded bars aged at 140° F. The impact strength in foot-pounds of the original molded bar is 7.4. After ageing for 5 weeks at 140° F. the impact strength is 6.2 and after 9 weeks 6.4. The viscosity of the original molded bar is 11.1 centipoises and after ageing at 140° F. for 5 weeks is 10.1, after 9 weeks 9.9 and after 18 weeks 5.3 centipoises.

Izod impact test bars molded of the composition above but without incorporating any phosphite stabilizer have an original impact strength of 5.0 foot-pounds. On ageing at 140° F. for 5 weeks the impact strength drops to 0.8 and after 9 weeks to 0.6. The viscosity of the unstabilized molded test bar is 8.5 centipoises and after ageing for 5 weeks at 140° F. is 3.8, after 9 weeks 2.6 and after 18 weeks is 1.4 centipoises.

Example VIII

A film is prepared by a suitable casting operation employing a casting solution consisting of 100 parts by weight of ethyl cellulose of an ethoxyl value of 45.9%, 1 part by weight of dibutyl-phthalate and 1 part by weight of tri-cresylphosphite dissolved in 300 parts by weight of 80/20 mixture of toluene and ethyl alcohol (solvent or solvent mixture). Samples of the film are aged in oxygen at 200° F. and the degree of polymerization of the aged films determined at intervals during the test. The degree of polymerization of the original film is considered as 100% and the degree of polymerization of the aged films is then determined employing the original degree of polymerization as the standard. After ageing in pure oxygen at 200° F. for 120 hours the stabilized film retains 92.8% of its original degree of polymerization while unstabilized film aged for the same period and under the same conditions retains but 65.6%. After 420 hours the stabilized film retains 68.5% of the original degree of polymerization while unstabilized film retains but about 21%.

It is to be understood that the foregoing detailed description is given merely by way of illustration and that many variations may be made therein without departing from the spirit of my invention.

Having described my invention, what I desire to secure by Letters Patent is:

1. A substantially color stable thermoplastic composition of matter resistant to color and viscosity changes under the action of heat, light and oxygen, comprising ethyl cellulose, mineral oil, and polymerized styrene, having incorporated therein as a stabilizing agent a neutral organic ester of phosphorous acid in an amount of at most 3% by weight of the ethyl cellulose.

2. A substantially color stable thermoplastic composition of matter resistant to color and viscosity changes under the action of heat, light and oxygen, comprising ethyl cellulose, mineral oil and polymerized styrene, having incorporated therein as a stabilizing agent tri-cresyl phosphite in an amount of at most 3% by weight of the ethyl cellulose.

3. A substantially color stable thermoplastic composition of matter resistant to color and viscosity changes under the action of heat, light and oxygen, comprising ethyl cellulose, mineral oil and polymerized styrene, having incorporated therein as a stabilizing agent tri-phenyl phosphite in an amount of at most 3% by weight of the ethyl cellulose.

4. A substantially color stable composition of matter resistant to color and viscosity changes under the action of heat, light and oxygen, comprising ethyl cellulose, mineral oil, and polymerized styrene, having incorporated therein as a stabilizing agent tri-p-tertiary amyl phenyl phosphite in an amount of at most 3% by weight of the ethyl cellulose.

5. A substantially color stable composition of matter resistant to color and viscosity changes under the action of heat and light and oxygen comprising a mixture of 100 parts by weight of ethyl cellulose, 5 parts by weight of refined mineral oil, about 20 parts by weight of a mixture consisting of dimer, trimer and tetramer of polymerized styrene and about 0.8 part by weight of tri-p-tertiary amyl phenyl phosphite.

6. A substantially color stable composition of matter resistant to color and viscosity changes under the action of heat, light and oxygen comprising a mixture of 100 parts by weight of ethyl cellulose, 5 parts by weight of refined mineral oil, about 20 parts by weight of a mixture consisting of the dimer, trimer and tetramer of polymerized styrene and about 0.8 part by weight of triphenyl phosphite.

WILLIAM B. HORBACK.

REFERENCES CITED

The following references are of record in the file of this patent:

UNITED STATES PATENTS

| Number | Name | Date |
|---|---|---|
| 1,886,775 | Zelger | Nov. 8, 1932 |
| 1,936,985 | Lommel et al. | Nov. 28, 1933 |
| 1,976,359 | Murray | Oct. 9, 1934 |
| 2,170,833 | Moyle | Aug. 29, 1939 |
| 2,294,211 | Rothrock | Aug. 25, 1942 |
| 2,299,096 | Krieger | Oct. 20, 1942 |
| 2,458,486 | Young | Jan. 4, 1949 |